US012576507B2

(12) United States Patent
Ingram et al.

(10) Patent No.: US 12,576,507 B2
(45) Date of Patent: Mar. 17, 2026

(54) APPARATUS AND METHOD FOR PRINTING A CONTOURED SURFACE

(71) Applicant: The Boeing Company, Chicago, IL (US)

(72) Inventors: Luke C. Ingram, Summerville, SC (US); Anthony W. Baker, Gilbertsville, PA (US); Steven A. Dorris, Willard, MO (US)

(73) Assignee: The Boeing Company, Arlington, VA (US)

( * ) Notice: Subject to any disclaimer, the term of this patent is extended or adjusted under 35 U.S.C. 154(b) by 704 days.

(21) Appl. No.: 17/878,880

(22) Filed: Aug. 1, 2022

(65) Prior Publication Data

US 2024/0034084 A1 Feb. 1, 2024

(51) Int. Cl.
*B25J 3/00* (2006.01)
*B25J 3/04* (2006.01)
(Continued)

(52) U.S. Cl.
CPC . *B25J 3/00* (2013.01); *B25J 3/04* (2013.01); *B41M 5/0041* (2013.01); *B25J 11/0075* (2013.01)

(58) Field of Classification Search
CPC ... B25J 11/0075; B25J 3/00; B25J 3/04; B41J 3/4073; B41M 5/0041; G05B 19/402
See application file for complete search history.

(56) References Cited

U.S. PATENT DOCUMENTS 10,293,601 B2 * 5/2019 Baker ................. B41J 2/04586
11,520,322 B2 * 12/2022 Mark ..................... G06N 3/092
(Continued)

FOREIGN PATENT DOCUMENTS

TW         I672018 B  *  9/2019
WO      2018222250      12/2018

OTHER PUBLICATIONS

Puigdomenech, et al., Agent57: Outperforming the human Atari benchmark, Mar. 31, 2020, accessed from https://www.deepmind.com/blog/agent57-outperforming-the-human-atari-benchmark on Jul. 22, 2022.
(Continued)

*Primary Examiner* — Scott T Baderman
*Assistant Examiner* — Mario M Velez-Lopez
(74) *Attorney, Agent, or Firm* — Kunzler Bean & Adamson

(57) ABSTRACT

Disclosed herein is a livery printing system and a method of generating a control path. The system includes a training system having a processor and a memory with code configured to cause the processor to receive a 3D digital model associated with an object; generate simulated control paths, based on the 3D digital model, for actuators of a printing device with printheads, determine a reward value for each one of the simulated control paths based on a simulated physical value, a simulated surface coverage value, or a simulated printing speed value. A value of one simulated control path variable of any of the simulated control paths is different than the value of the simulated control path variable of another simulated control path. One of the simulated control paths is selected based on a comparison between the reward values determined for the simulated control paths.

20 Claims, 8 Drawing Sheets

(51) Int. Cl.
  *B41M 5/00* (2006.01)
  *B25J 11/00* (2006.01)

(56) References Cited

U.S. PATENT DOCUMENTS

| | | | | |
|---|---|---|---|---|
| 11,595,549 | B2 * | 2/2023 | Yaghoobi | ............... G06F 3/1256 |
| 2013/0185039 | A1 * | 7/2013 | Tesauro | ............... G06Q 10/063 |
| | | | | 703/6 |
| 2015/0042716 | A1 * | 2/2015 | Beier | ................. B41J 11/00218 |
| | | | | 347/14 |
| 2015/0209960 | A1 | 7/2015 | Li et al. | |
| 2017/0182819 | A1 * | 6/2017 | Gonzalez Bruno | .... B41J 2/2135 |
| 2019/0001692 | A1 * | 1/2019 | Yamazaki | ................. B41J 29/02 |
| 2019/0030886 | A1 * | 1/2019 | Ingram | ................ B41M 5/0088 |
| 2020/0074307 | A1 * | 3/2020 | Kent | ....................... G06N 3/086 |
| 2021/0397142 | A1 * | 12/2021 | Lovell | ....................... G06N 3/08 |
| 2022/0379381 | A1 * | 12/2022 | Buller | ................... B29C 64/386 |
| 2023/0390865 | A1 * | 12/2023 | Sumi | ..................... B23K 26/082 |
| 2024/0034084 | A1 * | 2/2024 | Ingram | ................ B41M 5/0041 |
| 2024/0239112 | A1 * | 7/2024 | Freundt | .................... G06N 3/08 |
| 2024/0407872 | A1 * | 12/2024 | Liu | ......................... A61B 34/71 |

OTHER PUBLICATIONS

Raffin, A., Learning to Drive Smoothly in Minutes—Towards Data Science, accessed from https://towardsdatascience.com/learning-to-drive-smoothly-in-minutes-450a7cdb35f4 on May 16, 2022.
Extended European Search Report for EP Patent Application No. 23178784.7 dated Jan. 2, 2024.

* cited by examiner

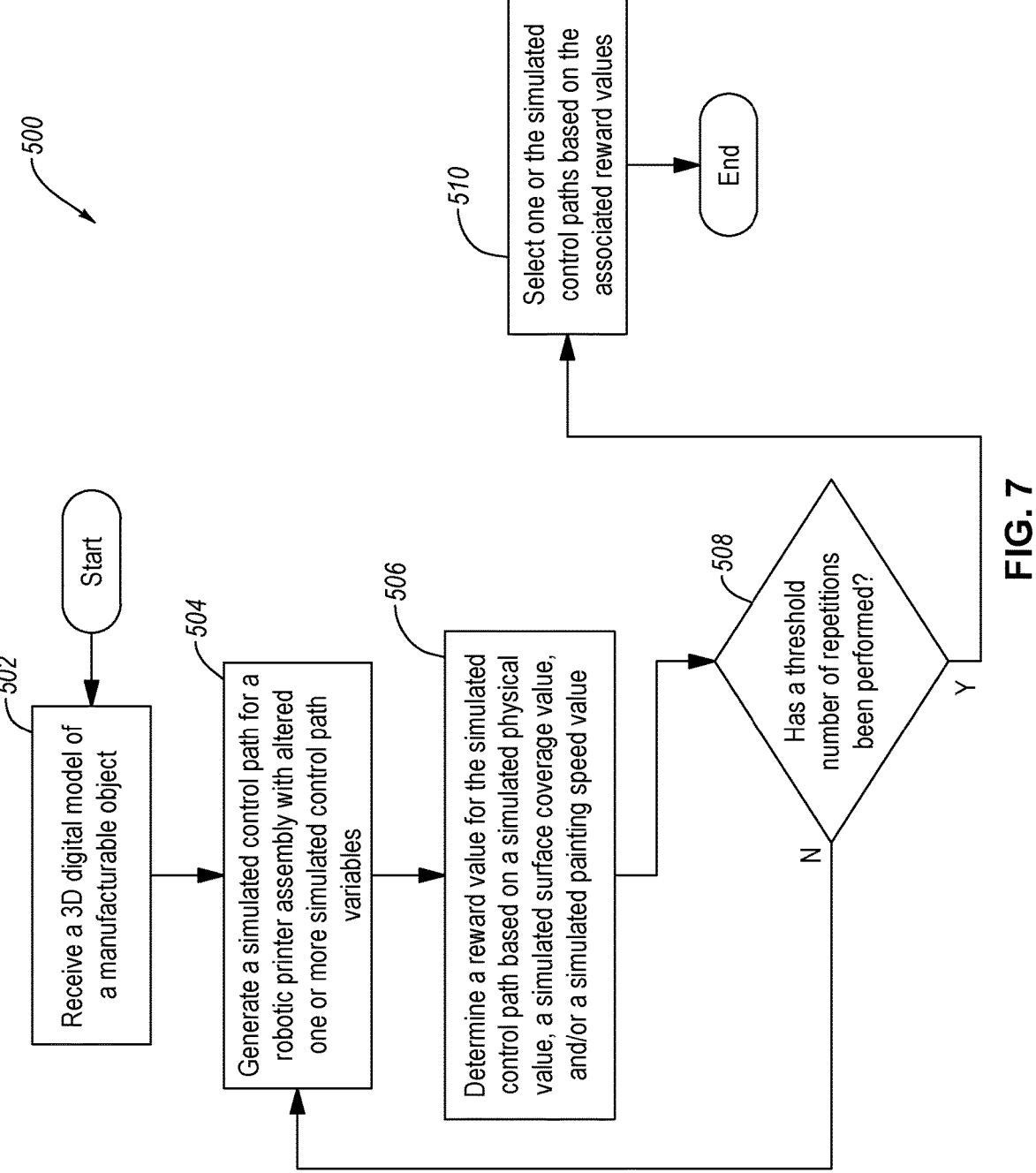

*500*

Start

*502*
Receive a 3D digital model of a manufacturable object

*504*
Generate a simulated control path for a robotic printer assembly with altered one or more simulated control path variables

*506*
Determine a reward value for the simulated control path based on a simulated physical value, a simulated surface coverage value, and/or a simulated painting speed value

*508*
Has a threshold number of repetitions been performed?

N

Y

*510*
Select one or the simulated control paths based on the associated reward values End

FIG. 7

APPARATUS AND METHOD FOR PRINTING A CONTOURED SURFACE

FIELD

This disclosure relates generally to printing contoured surfaces, and more particularly to optimizing generation of control path instructions for printing contoured surfaces.

BACKGROUND

Printing images onto complex 3D surfaces, and especially on curved surfaces such as those on an aircraft, is a complicated operation. Some systems for printing images include several printheads each dispersing one of different color inks onto a surface to be printed. The printheads move in concert at a very close distance to the surface (typically less than 8 mm). Robotic printing systems can reduce the time for completing a printing operation. However, because of the number of degrees of freedom, associated with robotic movement, planning a control path for the printhead, to fulfill a printing operation, can be challenging.

SUMMARY

The subject matter of the present application has been developed in response to the present state of the art, and in particular, in response to the shortcomings of conventional larger surface area printing, and including printing on a curved or contoured surface, that have not yet been fully solved by currently available techniques. Accordingly, the subject matter of the present application has been developed to provide reinforcement learning methods that overcome at least some of the above-discussed shortcomings of prior art techniques.

The following is a non-exhaustive list of examples, which may or may not be claimed, of the subject matter, disclosed herein.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which

FIG. 7 is a schematic flow diagram of a method of generating a control path, according to one or more examples of the present disclosure.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The following detailed description is intended to provide both apparatuses, systems, and methods for carrying out the disclosure. Actual scope of the disclosure is defined by the appended claims.

Figure 1:
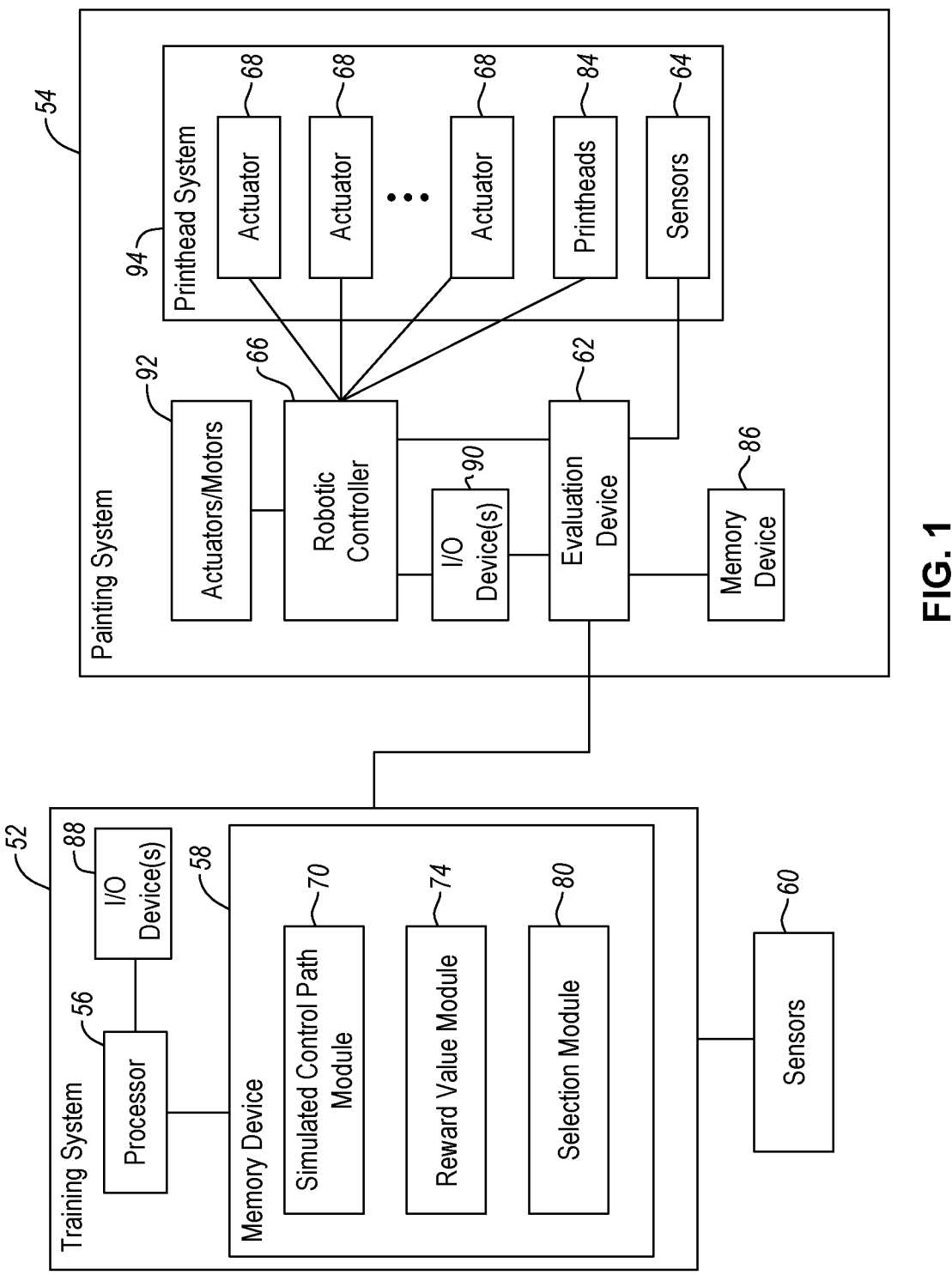
FIG. 1 is a block diagram of a training and printing system, according to one or more examples of the present disclosure.

Referring to FIG. 1, a livery-making system 50 includes a training system 52 and a painting system 54. The training system 52 provides a selected simulated control path 82 to the printing system 54 (see, e.g., FIG. 2). The printing system 54 uses the selected simulated control path 82, along with real-time sensor information, to control a robotic system for performing livery printing of an object.

In various embodiments, the training system 52 includes a processor 56, an input/output (I/O) device(s) 88, and a memory device 58. The processor 56 is in data communication with the I/O device(s) 88 and the memory device 58. The memory device 58 is a computer-readable medium that includes program code instructions (i.e., software) that when executed by the processor 56 performs a number of predefined tasks. The program code instructions include a simulated control path module 70, a reward value module 74, and a selection module 80.

The processor 56 receives a three-dimensional (3D) digital model of an object to be painted. The 3D model may be stored in the memory device 58 or the 3D model may be received from another 3D model generating system directly or indirectly connected to the training system 52 via a network device (not shown) or the I/O device(s) 88. The memory device 58 includes a non-transient computer-readable medium, such as random-access memory (RAM), read-only memory (ROM), or other memory structure.

In various embodiments, the processor 56 is configured to receive simulated sensor data or actual sensor data received from one or more sensors 60 of the livery-making system 50. The simulated or actual sensor data includes environmental information, such as humidity, atmospheric pressure, or other environmental data. Additionally, or alternatively, the simulated or actual sensor data includes simulated or actual measurement information. In some examples, the actual measurement information includes a value of a normal relationship (a normal vector) between the actual sensor 60 (i.e., the printheads 84 or print nozzles of the printheads 84) and a surface of the object. In other example examples, the simulated measurement information includes a value of a simulated normal relationship between a simulated sensor (i.e., simulated printheads or print nozzles of a simulated printing assembly) and a surface of the received 3D model of the object. Also, in some examples, the simulated or actual sensor data includes a value, corresponding with a distance from the simulated or actual sensors to the object. In the same or other examples, the simulated or actual sensor data includes a value, corresponding with a forward-looking distance between the simulated or actual sensors and a location on the object or 3D model, in front of the actual or simulated sensors and in a direction of travel of the actual or simulated printing assembly.

In various embodiments, the printing system 54 includes an evaluation device 62, a robotic controller 66, a printhead assembly 94, a memory device 86, and/or actuators/motors 92. The printhead assembly 94 includes a plurality of printheads 84, a plurality of actuators 68, and a plurality of sensors 64. The printing system 54 further includes various robotically-controlled components (e.g., the printhead assembly 94 (e.g., the actuators 68 and the printheads 84) and the actuators/motors 92). As used herein, a robotic system can include one or more robotic controllers, actuator arms, motors, wheels, pullies, end effectors, and the like, which in some examples are well known in the art. The robotic controller of the robotic system is programmable to control actuation of the actuatable components of the robotic system.

Figure 2:
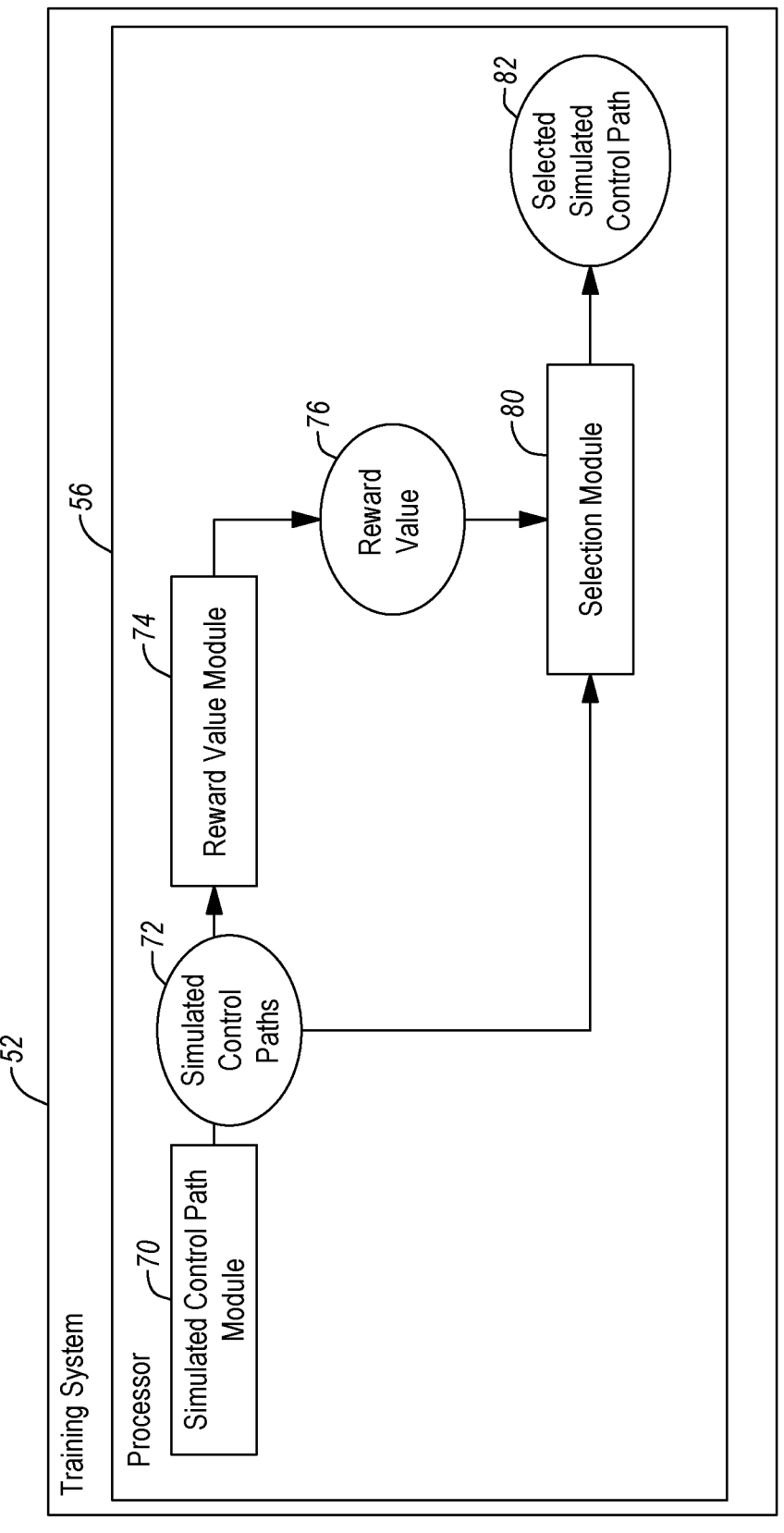
FIG. 2 is a schematic flow diagram of the training system of the livery-making system of FIG. 1.

In various embodiments, referring to FIG. 2, the simulated control path module 70 of the training system 52 causes the processor 56 to generate a plurality of simulated control paths 72. The simulated control paths 72 are determined paths for how the printhead assembly 94 is to move relative to an object that was created in accordance with the 3D model. Each of the generated simulated control paths 72 include a number of rewardable values. The rewardable values include at least a simulated physical value, a simulated coverage value, a simulated collision assessment, and/or a simulated speed value. The simulated physical value is an estimated value of where simulated printheads for the printing assembly are physically located (distance and/or normal value) relative to the surface of the 3D model as the printing assembly is projected to move according to the simulated control path. The simulated coverage value is a predicted value of a dots per unit of measure (e.g., inch (DPI), centimeter) of coverage of paint that is predicted to be deposited onto the manufacturable object in accordance with the simulated control path. The simulated collision assessment is a prediction of whether the printheads will collide with each other or with the surface of the 3D model. The simulated speed value is an estimated value of time of how long it would take to paint the manufacturable object in accordance with the simulated control path.

In an embodiment, the processor 56 receives one or more input parameters that are used by the processor 56 during the simulated control path generation. The input parameters are entered, or otherwise input, into the processor 56 using the I/O device(s) 88. Alternatively, the input parameters are stored in the a network database accessible via a public or private data network. As such, the input parameters are imported or controlling a plurality of actuators (68) uploaded into the processor 56 and/or the memory device 58, as needed to perform the simulated control path generation. Generally, the input parameters include information related to the printing system 54 and a surface, such as a contoured or curved surface of the object; however, the input parameters can be configured to include other information and data needed to complete the simulated control path generation. For example, one such input parameter used by the processor 56 is a print profile. In some embodiments, the print profile defines a desired resolution, in DPI, of a decorative livery coating to be applied to a surface, such as a contoured surface of an object. Additionally, the input parameters include a dispense gap value that is entered into the processor 56. The dispense gap value defines an acceptable range for a standoff (i.e., minimum and maximum distance) between the printhead assembly 94 and the surface of the 3D object. Moreover, a 3D model of the printhead assembly 94 is entered or otherwise provided as one of the input parameters into the processor 56.

In various embodiments, a Monte Carlo analysis is used to perform the simulated control point generation. The Monte Carlo analysis applies small permutations of various factors (e.g., input parameters, relative locations of printheads 84) in subsequent control path generation to see how they affect the response (i.e., the rewardable values).

Referring again to FIG. 2, the reward value module 74 causes the processor 56 to give a reward value 76 to each of the simulated control paths 72 for each of the rewardable values. The reward value 76 may include reward values for each of the rewardable values (physical value, coverage value, collision assessment value, and/or speed value) or may be a single reward value 76 that is a combination of reward values 76 for each of the rewardable values. For example, if the collision assessment value indicates that a simulated printhead assembly would make contact with the surface of the 3D model, the rating value assigned would either be a failed reward value or the lowest reward value attainable. A high reward value for the physical value would be assigned for the physical value (normal value, distance from printhead to surface of the 3D model, and/or projected travel distance value) to be within a predefined range that would be optimal for the printhead assembly 94 to deposit paint onto the surface of the 3D model and higher if outside the predefined range. The reward for the coverage value may be a low value if the simulated control path causes the painting assemblies to either deposit paint greater than an upper limit threshold amount or less than a lower limit threshold amount. The upper limit threshold amount might be one that would deposit more than a desired amount of paint on to the manufacturable object. The lower limit threshold amount might result in a livery image produced onto the manufacturable object to be less dense or not visually appealing. The reward value for the speed value might be a greater value if the speed value indicates the process to paint the manufacturable object according to the simulated control path would be less than a threshold value or faster than other speed values for other simulated control paths.

Referring again to FIG. 2, the selection module 80 causes the processor 56 to select the generated simulated control path according to the reward values. The selection module 80 may just select the lowest combined reward value or may assign different weighting factors to different ones of the reward values for the different rewardable values. For example, a user might give more weight to speed and less weight to coverage/resolution.

Communication between the printing system 54 and the control path training system 52 is established using a wired connection, a radio frequency network, a computer data network, a Wi-Fi data network, a cellular data network, a satellite data network, or other such data communication network. Establishing the communication network between the printing system 54 and the control path training system 52 allows the control path training system 52 to send or otherwise communicate a trained control path information for a target object or vehicle to the painting system 54. It can be appreciated that any weighting scenario may be used.

Furthermore, referring to FIG. 2, upon completion of the simulated control path generation, the processor 56 outputs the selected control path 82 to be used by the printing system 54 In one non-limiting example, the selected control path 82 is communicated over a network. Alternatively, the selected control path 82 is loaded onto the memory device 86 of the painting system 54.

In various embodiments, the painting system 54 includes an I/O device(s) 90, which provides an operator or other interested personnel access to the robotic controller 66 and/or the evaluation device 62 of the painting system 54. For example, the I/O device(s) 90 (and the I/O device(s) 88) is configured with an input device such as, but not limited to, a keyboard, mouse, dial, wheel, button, touch screen, microphone, or other input device. The operator can use the input device of the I/O device(s) 90 to enter or otherwise execute commands and instructions to be performed by the robotic controller 66. Additionally, the I/O device(s) 90 (and the I/O device(s) 88) is configured with an output device, such as, but not limited to, a monitor, screen, speaker, printer, or other output device. As a result, data and other information that is generated by the robotic controller 66 can be output to the operator by the I/O device(s) 90.

As discussed above, the robotic controller 66 is communicably coupled to the evaluation device 62, the printhead assembly 94, and the actuators/motors 92. The robotic controller 66 is programmed to transmit operational commands to the printhead assembly 94, and the other actuators/motors 92 for controlling movement of the other actuators/motors 92 and the actuators 68 of the printhead assembly 94. For example, the robotic controller 66 sends one or more control signals to the printhead assembly 94, which subsequently actuates the actuators 68 to position and orient the printheads 84 relative to the contoured surface of the manufacturable object or other contoured structure.

It will be understood that the evaluation device 62 and the robotic controller 66 may be embodied in a single controller programmed to specifically control and operate the actuators/motors 92, the actuators 68, and the printheads 84 based on the information received from the sensors 64 and the selected simulated control path 82 received from the training system 52.

In various embodiments, the sensors 64 are configured to scan and collect data during operation of the printing system 54, including printing operations performed by the robotic controller 66, the actuators/motors 92, and the printhead assembly 94. The evaluation device 62 may analyze the selected simulated control path and information from the sensors 64. In some examples, the sensors 64 include vision data sensors, such as a digital camera or other such vision sensors, distance data sensors, such as a time-of-flight camera, a light detection and ranging (LIDAR) sensors or other such distance measurement sensors, topography sensors, such as an interferometer, a profilometer or other such surface topography sensors, capacitive transducers, or ultrasound transducers.

In one non-limiting example, the sensors 64 include surface scanning lasers configured to scan and collect surface topography data of the contoured surface of the vehicle 100 and the surrounding areas. The surface topography data may include surface roughness data, surface imaging data, location/positioning data, height sense data, angular orientation data, and any other such surface data. This data is transmitted or otherwise sent to the evaluation device 62 for analysis. In some embodiments, the evaluation device 62 generates and/or updates the control path for delivery to the robotic controller 66 in real-time based off the data collected by the sensors 64. Additionally or alternatively, data collected by the sensors 64 is stored in the memory device 86 and analyzed at a later time or sent back to the training system 52 for use in generating future control paths.

Figure 3:
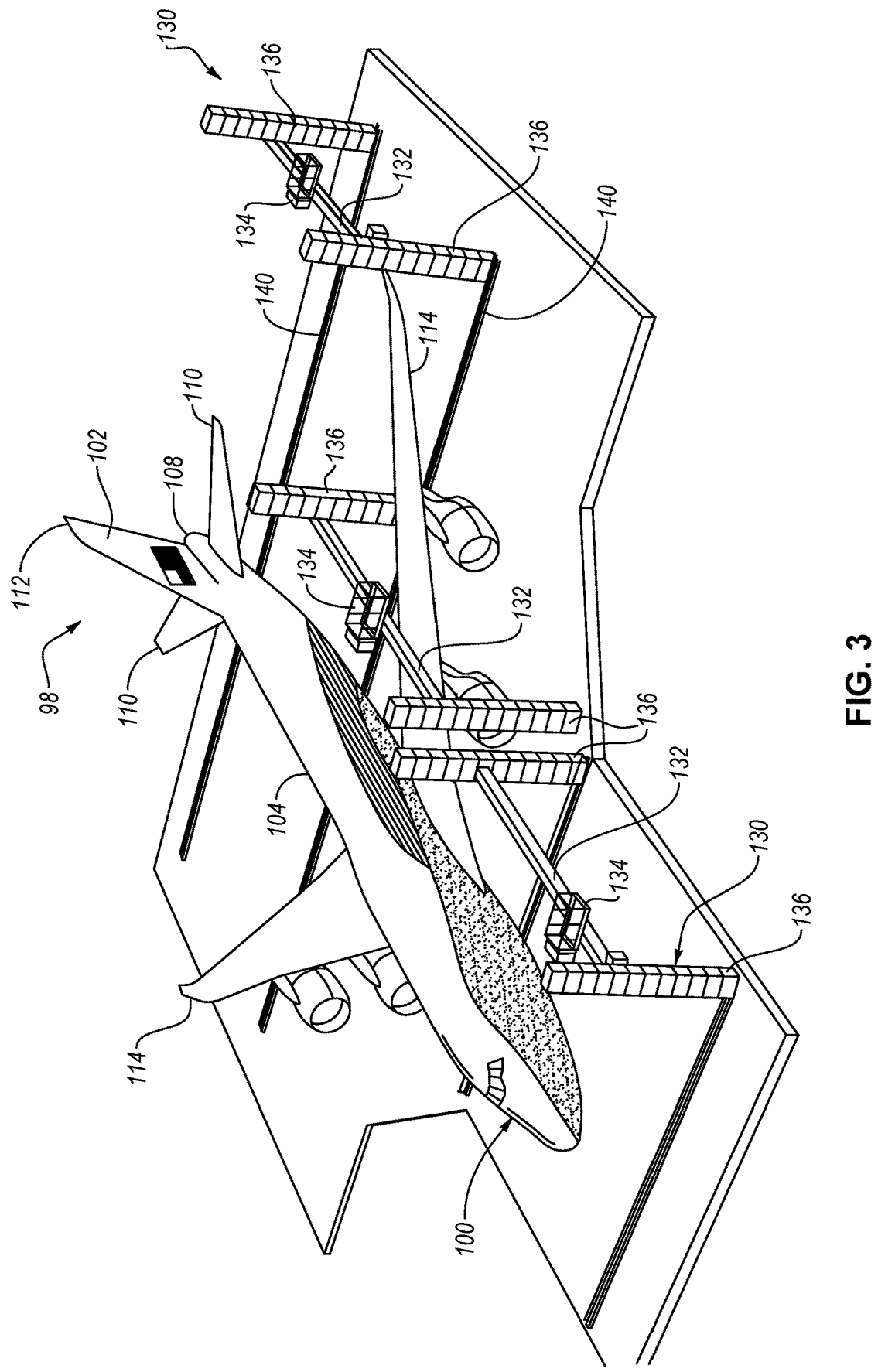
FIG. 3 is a perspective view of a printing environment, according to one or more examples of the present disclosure.

In various embodiments, as shown in FIG. 3, a vehicle 100 is located in a work area 98 where a decorative livery coating is applied to the vehicle. One non-limiting example of the vehicle 100 is an aircraft. However, in other examples, to the vehicle 100 can be other types of vehicles and machines, such as watercraft, automobiles, transportation vehicles such as busses, subways, trolleys, etc., rotorcraft, spacecraft, and the like. As illustrated, the vehicle 100 includes a fuselage 104, a pair of wings 114, and a tail section 112. The decorative livery coating creates a visible, decorative design along the contoured surface of the vehicle 100 that helps identify and distinguish the vehicle 100, such as from other vehicles. The decorative livery coating is applied by the painting system 54 to a contoured surface of the vehicle 100, such as, without limitation, the fuselage 104, the pair of wings 114, the tail section 112, or other features of the vehicle 100. The tail section 112 may include a vertical stabilizer 102, a horizontal stabilizer 110, and an aft fuselage component 108.

The work area 98 may include multiple moving painting or printing structures 130. In some examples, the painting or printing structures 130 include towers 136 and a beam 132 mounted between corresponding pairs of the towers 136. In some examples, the printhead assembly 94 is mounted to a car assembly 134 of the work area 98, which is slidably mounted to the beam 132. The painting structures 130 include motors (not shown) for allowing motion of the towers 136 along tracks 140 of the work area 98. Other motors (not shown) allow for the beam 132 to move up and down the towers 136. Still other motors (not shown) allow for the car assembly 134 to move along the beam 132. The motors described here are part of the actuators/motors 92 of the painting system 54 of FIG. 1.

Figure 4:
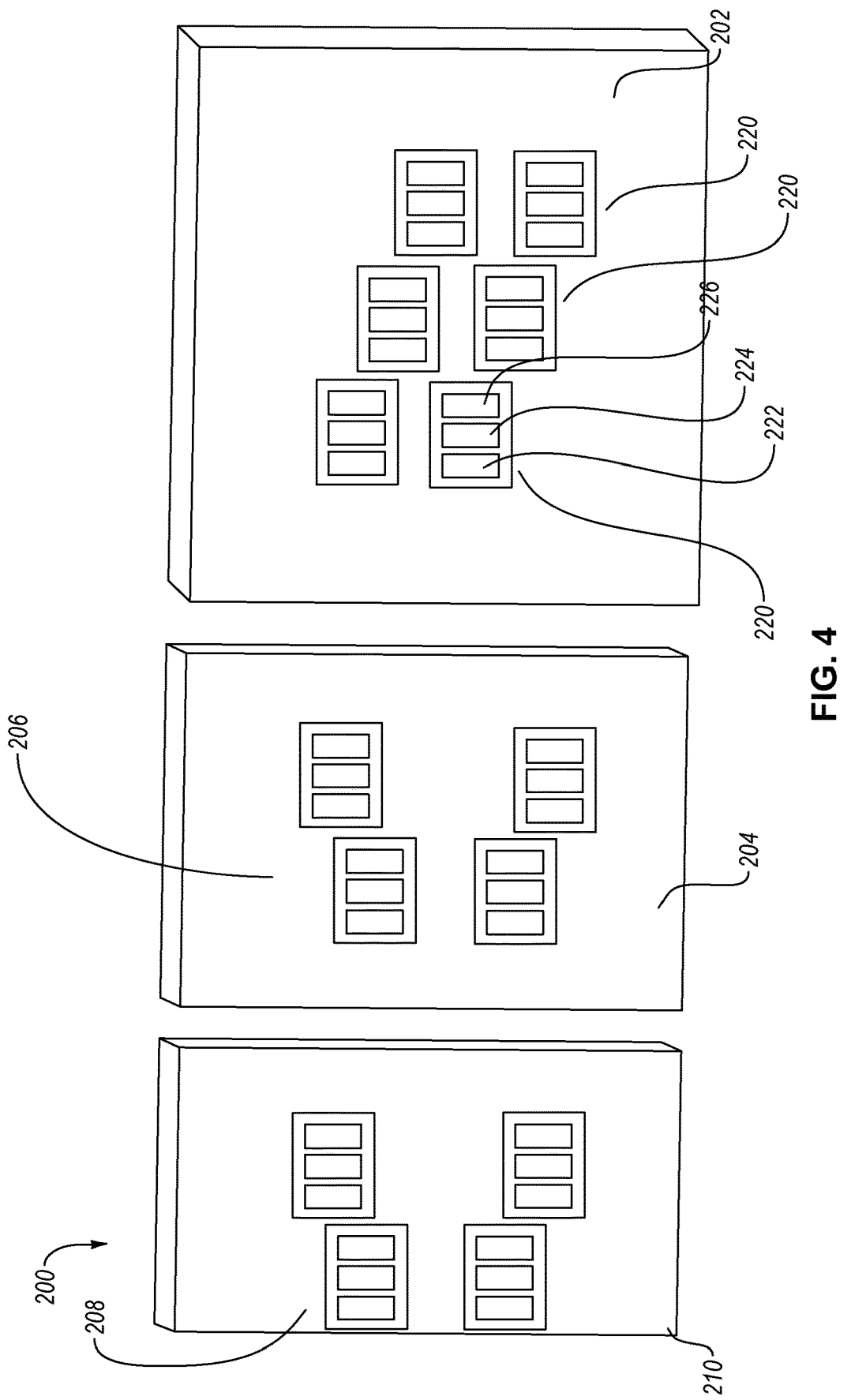
FIG. 4 is a plan view of multiple printheads of the printing system of FIG. 1, according to one or more examples of the present disclosure.
Figure 5:
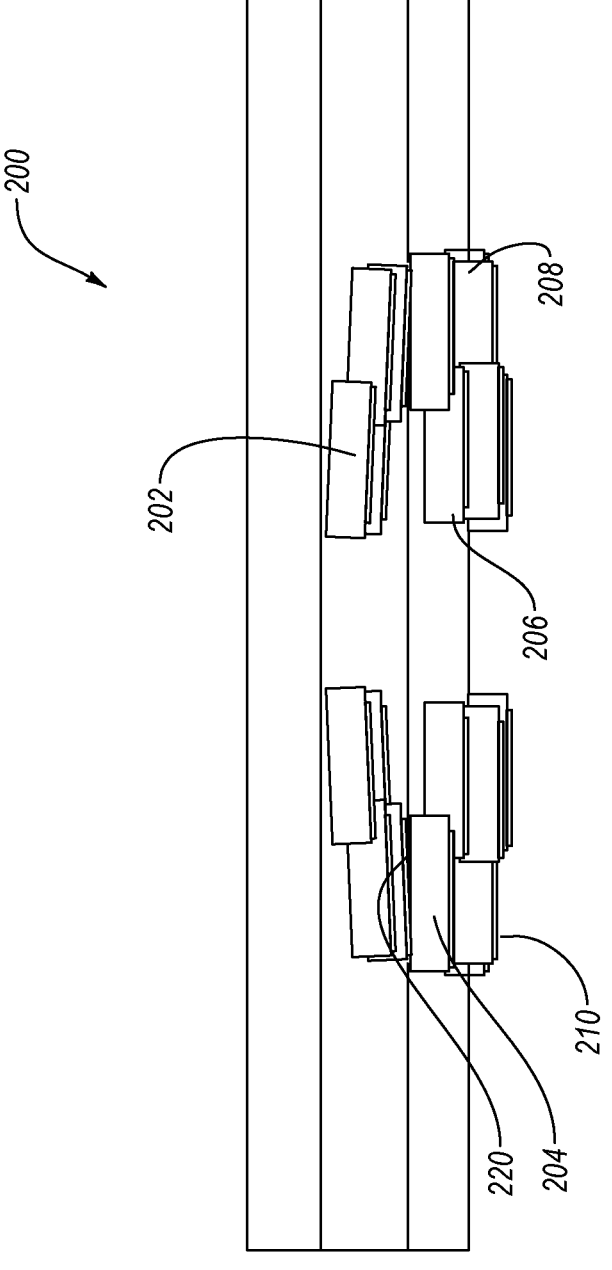
FIG. 5 is a side view of the multiple printheads of FIG. 4, according to one or more examples of the present disclosure.

Referring now to FIGS. 4 and 5, a printhead assembly 200, which is one example of the printhead assembly 94 of the painting system 54, includes printheads 220, which are inkjet printheads in some examples. The printheads 220 can be separately controllable with corresponding ones of multiple actuators, such as actuators 310-314, shown in FIGS. 6-8. The printheads 220 are configured to dispense a decorative livery coating, or other such surface treatment layer, along the contoured surface of the vehicle 100. Accordingly, each one of the printheads 220 includes a plurality of nozzles 222, 224, 226, each configured to apply an ink, paint, primer and/or other such surface coating onto the contoured surface of the vehicle 100. Generally, each one of the nozzles 222, 224, 226 is configured to dispense one color from a group of desired colors. In one non-limiting example, the group of colors includes red (R), green (G), and blue (B) or cyan (C), magenta (M), yellow (Y), and black (K). However, in other examples, the group of colors can include additional or alternative colors. Additionally, each one of the printheads 220 includes a tool center point (TCP) that is defined in the center of the printhead. The TCPs of the printheads 220 serve as a reference point of the printheads 220, and help define a reference point of the printhead assembly 200, which is used, at least in part, to determine the position, orientation, and other such parameters of the printhead assembly 200, the printheads 220, and the contoured surface of the vehicle 100, or other such surface being treated by the painting system 54, relative to each other.

Referring again to FIGS. 4 and 5, in an embodiment herein, the printhead assembly 200 includes multiple printheads 220 each located on a corresponding one of different actuator-controlled surfaces 202, 204, 206, 208, 210. Because the different actuator-controlled surfaces 202, 204, 206, 208, 210 are controlled by different actuator(s) (e.g., the actuators 310-314 of FIG. 6), the actuator-controlled surfaces 202, 204, 206, 208, 210 move relative to each other. and may have a tightly aligned configuration, like that shown in FIG. 4 or may have an expanded configuration like that shown in FIG. 5. As the printhead assembly 200 is moved about a surface, such as a contoured surface in a tightly aligned configuration, a smaller area is able to receive ink deposited by the nozzles 222, 224, 226. The tightly aligned configuration would allow for the nozzles 222, 224, 226 to apply overlapping ink as the printhead assembly 200 moves. When the printhead assembly 200 is in the expanded configuration, and for a given speed of the printhead assembly 200 along the surface being treated, a larger area may be covered with less dots per square inch of ink as in the tightly aligned configuration.

Figure 6:
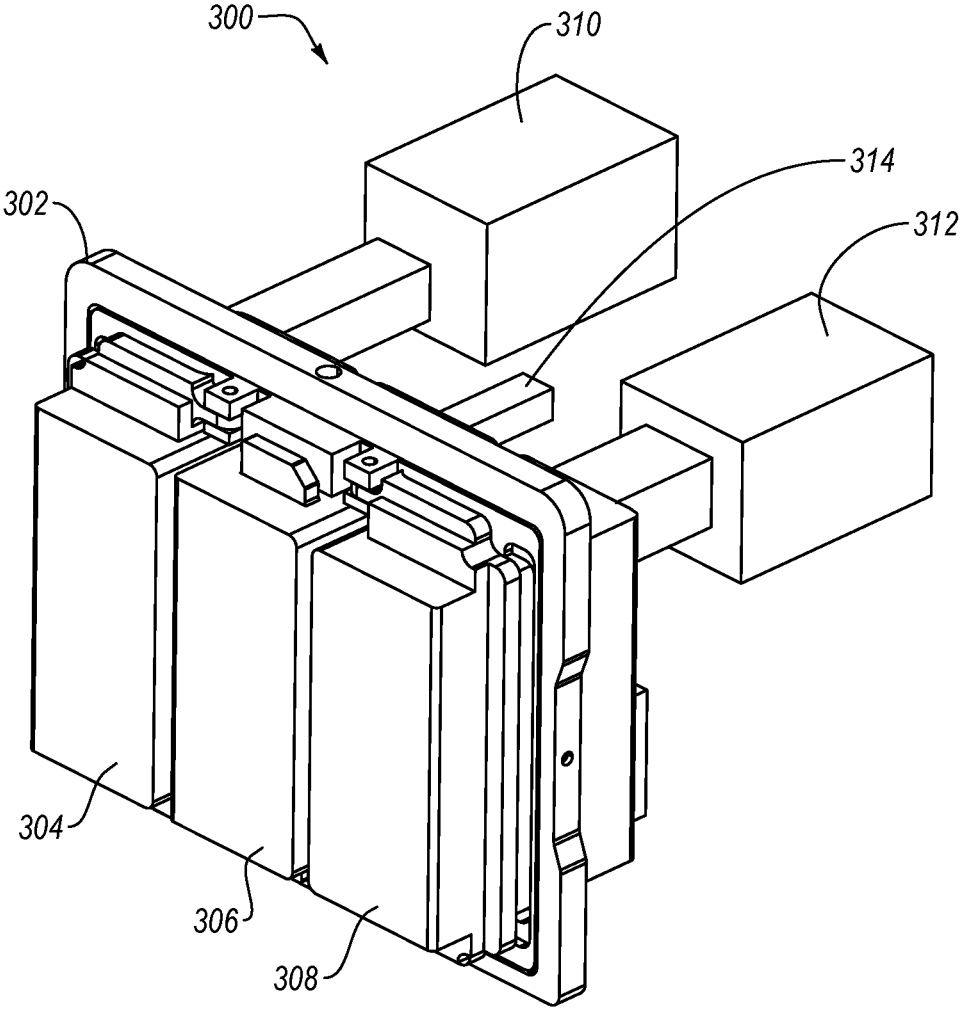
FIG. 6 is a perspective view of a printhead assembly of the printing system of FIG. 1 according to one or more examples of the present disclosure.

Referring to FIG. 6, a printhead assembly 300, which is one example of the printhead assembly 94 of the printing system 54, includes a first actuator 310, a second actuator 312, and a third actuator 314, among other actuators not shown. The actuators 310, 312, 314 cause motion of an outer frame 302 and other frame and non-frame components of the printhead assembly 300 about different axis points. The printhead assembly 300 includes printheads 304, 306, 308 that rotatably mount within the outer frame 302. Each of the printheads 304, 306, 308 or a support device near the printheads 304, 306, 308 includes forward looking sensors and normal measuring sensors.

It can be appreciated that printing systems may include any number of printheads, nozzles, actuators, axes of motion, etc.

Referring to FIG. 7, according to one example, a method 500 of generating a simulated control path is shown. The method 500 includes (block 502) receiving a 3D digital model of a manufacturable object. Additionally, the method 500 includes (block 504) generating a simulated control path for a robotic printer assembly with altered one or more simulated control path variables. Additionally, the method 500 includes (block 506) determining a reward value for the simulated control path based on a simulated physical value, a simulated surface coverage value, and/or a simulated printing speed value. Additionally, the method 500 includes (block 508) determining if a threshold number of repetitions of the steps at blocks 504 and 506 have been performed. If the threshold number of repetitions have not been reached, the method 500 returns to block 504 for generating more simulated control paths. Additionally, the method 500 includes (block 510) selecting one of the simulated control paths based on the associated reward values, if the threshold number of repetitions has been met at block 508. The selection of a simulated control path from a plurality of simulated control paths by analyzing reward values for various aspects of printing the object produce a highly accurate control path. This highly accurate control path provides a printing system an effective starting control path for a printing system to follow during actual printing of the object.

Figure 8:
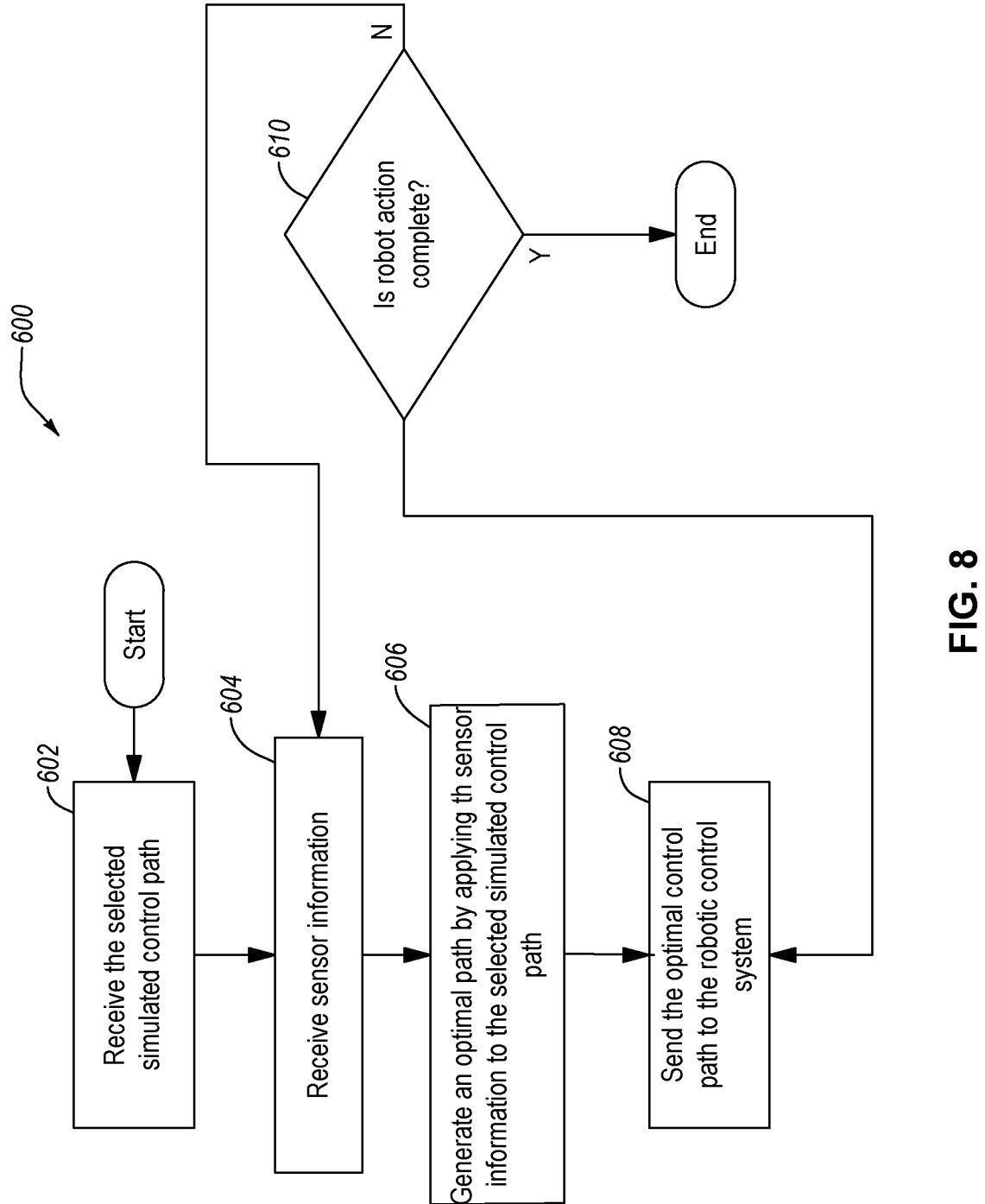
FIG. 8 is a schematic flow diagram of a method of controlling painting assemblies, pursuant to a generated control path, according to one or more examples of the present disclosure.

Referring to FIG. 8, according to one example, a method 600 of printing of an object is shown. The method 600 includes (block 602) receiving the selected simulated control path. Additionally, the method 600 includes (block 604) receiving sensor information as printing of the object is occurring. Additionally, the method 600 includes (block 606) generating an optimal path by applying the sensor information to the selected simulated control path. Additionally, the method 600 includes (block 608) sending the optimal control path to a robotic controller. Additionally, the method 600 includes (block 610) determining if printing of the object is complete. If the printing is not complete, the method 600 returns to block 604.

The methods and processes described herein with regard to printing may also be used with other surface treatment equipment, such as, without limitation, cleaning, abrading, priming, protecting, repairing, or other such surface treatment applied along the contoured surface of the object to be treated.

The following portion of this paragraph delineates example 1 of the subject matter, disclosed herein. According to example 1, a method includes a step of receiving a three-dimensional (3D) digital model associated with a manufacturable object. The method also includes a step of generating a plurality of simulated control paths, based at least partially on the 3D digital model, for a plurality of actuators of a printing device having a plurality of printheads. The method further includes a step of determining a reward value for each one of the plurality of simulated control paths based on at least one of a simulated physical value, a simulated surface coverage value, or a simulated printing speed value associated with a corresponding one of the plurality of simulated control paths. A value of at least one simulated control path variable of any one of the plurality of simulated control paths is different than the value of the at least one simulated control path variable of any other one of the plurality of simulated control paths. The method additionally includes a step of selecting one of the plurality of simulated control paths based on a comparison between the reward values determined for the plurality of simulated control paths.

The following portion of this paragraph delineates example 2 of the subject matter, disclosed herein. According to example 2, which encompasses example 1, above, the simulated physical value comprises at least one of a value, indicating simulated normality of the printing device relative to a surface of the 3D digital model, or a value, indicating a simulated distance between the printing device and the surface of the 3D digital model.

The following portion of this paragraph delineates example 3 of the subject matter, disclosed herein. According to example 3, which encompasses any of examples 1 and 2, above, the simulated surface coverage value comprises a value indicating a simulated quantity of dots per measure of distance applied by the printing device.

The following portion of this paragraph delineates example 4 of the subject matter, disclosed herein. According to example 4, which encompasses any one of examples 1-3, above, the simulated printing speed value comprises a value indicating a simulated time to complete printing of the object using the printing device.

The following portion of this paragraph delineates example 5 of the subject matter, disclosed herein. According to example 5, which encompasses any one of examples 1-4, above, the step of generating the plurality of simulated control paths comprises performing a recursive Monte Carlo algorithm.

The following portion of this paragraph delineates example 6 of the subject matter, disclosed herein. According to example 6, which encompasses any one of examples 1-5, above, the method also includes a step of sending the selected one of the plurality of simulated control paths to a printing system.

The following portion of this paragraph delineates example 7 of the subject matter, disclosed herein. According to example 7, which encompasses example 6, above, the method further includes a step of controlling a plurality of actuators while printing the manufacturable object according to the selected one of the plurality of simulated control paths. The method also includes a step of receiving actual sensor data, associated with a printing environment and the manufacturable object. The method additionally includes a step of generating an updated control path, by updating the selected one of the plurality of simulated control paths responsive to the actual sensor data and the selected one of the plurality of simulated control paths. The method further includes steps of sending the updated control path to the robotic controller and controlling the plurality of actuators while printing the manufacturable object according to the updated control path.

The following portion of this paragraph delineates example 8 of the subject matter, disclosed herein. According to example 8, which encompasses example 7, above, the actual sensor data comprises at least one of humidity information, first distance-to-surface information, received from at least one first proximity sensor facing in a first direction orthogonal to the plurality of printheads, or second distance-to-surface information, received from at least one second proximity sensor facing in second direction oblique relative to the plurality of printheads.

The following portion of this paragraph delineates example 9 of the subject matter, disclosed herein. According to example 9, a training system includes a processor and a memory configured to store computer-executable code. The computer-executable code is configured to cause the processor to perform the steps of receiving a 3D digital model associated with a manufacturable object and generating a plurality of simulated control paths, based at least partially on the 3D digital model, for a plurality of actuators of a printing device having a plurality of printheads. The computer-executable code is further configured to cause the processor to perform the step of determining a reward value for each one of the plurality of simulated control paths based on at least one of a simulated physical value, a simulated surface coverage value, or a simulated printing speed value associated with a corresponding one of the plurality of simulated control paths. A value of at least one simulated control path variable of any one of the plurality of simulated control paths is different than the value of the at least one simulated control path variable of any other one of the plurality of simulated control paths. The computer-executable code is additionally configured to cause the processor to perform a step of selecting one of the plurality of simulated control paths based on a comparison between the reward values determined for the plurality of simulated control paths.

The following portion of this paragraph delineates example 10 of the subject matter, disclosed herein. According to example 10, which encompasses example 9, above, the simulated physical value comprises at least one of a value, indicating simulated normality of the printing device relative to a surface of the 3D digital model, or a value, indicating a simulated distance between the printing device and the surface of the 3D digital model.

The following portion of this paragraph delineates example 11 of the subject matter, disclosed herein. According to example 11, which encompasses any of examples 9 and 10, above, the simulated surface coverage value comprises a value indicating a simulated quantity of dots per measure of distance applied by the printing device.

The following portion of this paragraph delineates example 12 of the subject matter, disclosed herein. According to example 12, which encompasses any one of examples 9-11, above, the simulated printing speed value comprises a value indicating a simulated time to complete printing of the object using the printing device.

The following portion of this paragraph delineates example 13 of the subject matter, disclosed herein. According to example 13, which encompasses any one of examples 9-12, above, the step of generating the plurality of simulated control paths comprises performing a recursive Monte Carlo algorithm.

The following portion of this paragraph delineates example 14 of the subject matter, disclosed herein. According to example 14, which encompasses any of examples 9-13, above, the code is further configured to cause the processor to perform the step of sending the selected one of the plurality of simulated control paths to a robotic control system.

The following portion of this paragraph delineates example 15 of the subject matter, disclosed herein. According to example 15, which encompasses example 14, above, the system further includes a plurality of sensors configured to provide actual sensor data, associated with a printing environment and the manufacturable object. The code is further configured to cause the processor to perform the steps of controlling a plurality of actuators while printing the manufacturable object according to the selected one of the plurality of simulated control paths and receiving actual sensor data, associated with a printing environment and the manufacturable object. The code is further configured to cause the processor to perform the step of generating an updated control path, by updating the selected one of the plurality of simulated control paths responsive to the actual sensor data and the selected one of the plurality of simulated control paths. The code is further configured to cause the processor to perform the step of controlling the plurality of actuators based on the updated control path.

The following portion of this paragraph delineates example 16 of the subject matter, disclosed herein. According to example 16, which encompasses example 15, above, the actual sensor data comprises at least one of: humidity information; first distance-to-surface information, received from at least one first proximity sensor facing in a first direction orthogonal to the plurality of printheads; or second distance-to-surface information, received from at least one second proximity sensor facing in second direction oblique relative to the plurality of printheads.

The following portion of this paragraph delineates example 17 of the subject matter, disclosed herein. According to example 17, a printing system includes a plurality of sensors configured to provide actual sensor data, associated with a printing environment and the manufacturable object; a plurality of printheads. The printing system further includes a plurality of actuators configured control multi-axle motion of the plurality of printheads, and a processor. The printing system also includes a memory configured to store computer-executable code configured to cause the processor to perform the steps of receiving a 3D digital model associated with a manufacturable object and generating a plurality of simulated control paths, based at least partially on the 3D digital model, for a plurality of actuators of a printing device having a plurality of printheads. The code is further configured to cause the processor to perform the step of determining a reward value for each one of the plurality of simulated control paths based on at least one of a simulated physical value, a simulated surface coverage value, or a simulated printing speed value associated with a corresponding one of the plurality of simulated control paths. The code is further configured to cause the processor to perform the step of selecting one of the plurality of simulated control paths based on a comparison between the reward values determined for the plurality of simulated control paths. A value of at least one simulated control path variable of any one of the plurality of simulated control paths is different than the value of the at least one simulated control path variable of any other one of the plurality of simulated control paths.

The following portion of this paragraph delineates example 18 of the subject matter, disclosed herein. According to example 18, which encompasses example 17, above, the simulated physical value comprises at least one of a value, indicating simulated normality of the printing device relative to a surface of the 3D digital model, or a value, indicating a simulated distance between the printing device and the surface of the 3D digital model.

The following portion of this paragraph delineates example 19 of the subject matter, disclosed herein. According to example 19, which encompasses any one of examples 17 and 18, above, the simulated surface coverage value includes a value indicating a simulated quantity of dots per measure of distance applied by the printing device and the simulated printing speed value comprises a value indicating a simulated time to complete printing of the object using the printing device.

The following portion of this paragraph delineates example 20 of the subject matter, disclosed herein. According to example 20, which encompasses any one of examples 17-19, above, the code comprises a recursive Monte Carlo algorithm configured to cause the processor to generate the plurality of simulated control paths.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A method comprising:

receiving a three-dimensional (3D) digital model associated with a manufacturable object;

generating a plurality of simulated control paths, based at least partially on the 3D digital model, for a plurality of actuators of a printing device having a plurality of printheads;

determining a reward value for each one of the plurality of simulated control paths based on at least two simulated values, the at least two simulated values being associated with a corresponding one of the plurality of simulated control paths and comprising at least one of a simulated collision value indicating a likelihood of collision between two or more printheads of the plurality of printheads, a comparison of a first threshold value to a simulated surface coverage value indicating a simulated quantity of dots per measure of distance applied by the printing device, or a comparison of a second threshold value to a simulated printing speed value indicating a simulated time to complete printing of the manufacturable object using the printing device, wherein a value of at least one simulated control path variable of any one of the plurality of simulated control paths is different than the value of the at least one simulated control path variable of any other one of the plurality of simulated control paths;

determining a weight value for each of the at least two simulated values, wherein a weight value of at least one of the at least two simulated values is different than the weight value of any other one of the at least two simulated values; and selecting one of the plurality of simulated control paths based on a comparison between the reward values determined for the plurality of simulated control paths and on a comparison between the weight values determined for the at least two simulated values.

2. The method of claim 1, wherein the simulated physical value comprises at least one of a value, indicating simulated normality of the printing device relative to a surface of the 3D digital model, or a value, indicating a simulated distance between the printing device and the surface of the 3D digital model.

3. The method of claim 1, wherein the step of generating the plurality of simulated control paths comprises performing a recursive Monte Carlo algorithm.

4. The method of claim 1, further comprising a step of sending the one of the plurality of simulated control paths to a robotic controller.

5. The method of claim 4, further comprising steps of:

controlling a plurality of actuators while printing the manufacturable object according to the one of the plurality of simulated control paths;

receiving actual sensor data, associated with a printing environment and the manufacturable object;

generating an updated control path, by updating the one of the plurality of simulated control paths responsive to the actual sensor data and the one of the plurality of simulated control paths;

sending the updated control path to the robotic controller; and controlling the plurality of actuators while printing the manufacturable object according to the updated control path.

6. The method of claim 5, wherein the actual sensor data comprises at least one of:

humidity information;

first distance-to-surface information, received from at least one first proximity sensor facing in a first direction orthogonal to the plurality of printheads; or second distance-to-surface information, received from at least one second proximity sensor facing in second direction oblique relative to the plurality of printheads.

7. The method of claim 1, wherein the determined weight value for each of the at least two simulated values is different from each of the at least two simulated values.

8. The method of claim 1, further comprising receiving an input from a user and determining the weight value for each of the at least two simulated values based at least in part on the input.

9. A system comprising:

a processor; and a memory configured to store computer-executable code configured to cause the processor to perform the steps of:

receiving a three-dimensional (3D) digital model associated with a manufacturable object;

generating a plurality of simulated control paths, based at least partially on the 3D digital model, for a plurality of actuators of a printing device having a plurality of printheads;

determining a reward value for each one of the plurality of simulated control paths based on at least two simulated values, the at least two simulated values being associated with a corresponding one of the plurality of simulated control paths and comprising at least one of a simulated collision value indicating a likelihood of collision between two or more printheads of the plurality of printheads, a comparison of a first threshold value to a simulated surface coverage value indicating a simulated quantity of dots per measure of distance applied by the printing device, or a comparison of a second threshold value to a simulated printing speed value indicating a simulated time to complete printing of the manufacturable object using the printing device, wherein a value of at least one simulated control path variable of any one of the plurality of simulated control paths is different than the value of the at least one simulated control path variable of any other one of the plurality of simulated control paths;

determining a weight value for each of the at least two simulated values, wherein a weight value of at least one of the at least two simulated values is different than the weight value of any other one of the at least two simulated values; and selecting one of the plurality of simulated control paths based on a comparison between the reward values determined for the plurality of simulated control paths and on a comparison between the weight values determined for the at least two simulated values.

10. The system of claim 9, wherein the simulated physical value comprises at least one of a value, indicating simulated normality of the printing device relative to a surface of the 3D digital model, or a value, indicating a simulated distance between the printing device and the surface of the 3D digital model.

11. The system of claim 9, wherein the step of generating the plurality of simulated control paths comprises performing a recursive Monte Carlo algorithm.

12. The system of claim 9, wherein the code is further configured to cause the processor to perform the step of sending the one of the plurality of simulated control paths to a printing controller.

13. The system of claim 12, further comprising:

a plurality of sensors configured to provide actual sensor data, associated with a printing environment and the manufacturable object, wherein the code is further configured to cause the processor to perform the steps of:

controlling a plurality of actuators while printing the manufacturable object according to the selected one of the plurality of simulated control paths;

receiving actual data, associated with a printing environment and the manufacturable object;

generating an updated control path, by updating the one of the plurality of simulated control paths responsive to the actual sensor data and the one of the plurality of simulated control paths; and controlling a plurality of actuators based on the updated control path.

14. The system of claim 13, wherein the actual sensor data comprises at least one of:

humidity information;

first distance-to-surface information, received from at least one first proximity sensor facing in a first direction orthogonal to the plurality of printheads; or second distance-to-surface information, received from at least one second proximity sensor facing in second direction oblique relative to the plurality of printheads.

15. The system of claim 9, wherein the determined weight value for each of the at least two simulated values is different from each of the at least two simulated values.

16. The system of claim 9, wherein the code is further configured to cause the processor to perform the steps of receiving an input from a user and determining the weight value for each of the at least two simulated values based at least in part on the input.

17. A printing system comprising:

a plurality of sensors configured to provide actual sensor data, associated with a printing environment and a manufacturable object;

a plurality of printheads;

a plurality of actuators configured control multi-axle motion of the plurality of printheads;

a processor; and a memory configured to store computer-executable code configured to cause the processor to perform the steps of:

receiving a three-dimensional (3D) digital model associated with a manufacturable object;

generating a plurality of simulated control paths, based at least partially on the 3D digital model, for a plurality of actuators of a printing device having a plurality of printheads;

determining a reward value for each one of the plurality of simulated control paths based on at least two simulated values, the at least two simulated values being associated with a corresponding one of the plurality of simulated control paths and comprising at least one of a simulated collision value indicating a likelihood of collision between two or more printheads of the plurality of printheads, a comparison of a first threshold value to a simulated surface coverage value indicating a simulated quantity of dots per measure of distance applied by the printing device, or a comparison of a second threshold value to a simulated printing speed value indicating a simulated time to complete printing of the manufacturable object using the printing device, wherein a value of at least one simulated control path variable of any one of the plurality of simulated control paths is different than the value of the at least one simulated control path variable of any other one of the plurality of simulated control paths;

determining a weight value for each of the at least two simulated values, wherein a weight value of at least one of the at least two simulated values is different than the weight value of any other one of the at least two simulated values; and selecting one of the plurality of simulated control paths based on a comparison between the reward values determined for the plurality of simulated control paths and on a comparison between the weight values determined for the at least two simulated values.

18. The system of claim 17, wherein the simulated physical value comprises at least one of a value, indicating simulated normality of the printing device relative to a surface of the 3D digital model, or a value, indicating a simulated distance between the printing device and the surface of the 3D digital model.

19. The system of claim 17, wherein the code comprises a recursive Monte Carlo algorithm configured to cause the processor to perform the step of generating the plurality of simulated control paths.

20. The system of claim 17, wherein the determined weight value for each of the at least two simulated values is different from each of the at least two simulated values.

* * * * *